United States Patent [19]

Been et al.

[11] 4,207,116

[45] Jun. 10, 1980

[54] GRANULATED MATERIAL AND PROCESS FOR THE PRODUCTION OF GRANULATED MATERIALS

[75] Inventors: Karl Been, Santpoort; Cornelis Bontenbal, Ijsselmuiden, both of Netherlands

[73] Assignee: Bepro B. V., Netherlands

[21] Appl. No.: 902,664

[22] Filed: May 4, 1978

[51] Int. Cl.$^2$ ............................................. C04B 7/02
[52] U.S. Cl. ........................................ 106/97; 106/98
[58] Field of Search ................. 106/97, 98; 252/449

[56] References Cited

U.S. PATENT DOCUMENTS

| | | | |
|---|---|---|---|
| 2,643,193 | 6/1953 | Weber | 106/98 |
| 2,918,385 | 12/1959 | Arpin et al. | 106/98 |
| 3,719,511 | 3/1973 | Bevard et al. | 106/97 |

*Primary Examiner*—James Poer

[57] ABSTRACT

A granulated absorbent material comprises cement, a clay preferably comprising sodium bentonite and an aggregate together with water, the weight ratio of cement to the total of the aggregate being in the range of 55:45 to 65:35, the ratio of clay to water being such that a mixture thereof has a viscosity in the range of 15-25 centipoises at 20° C., and the quantity of water being in the range of 60-120% by weight of the dry constituents. The method of preparing the absorbent material comprises forming a paste of the constituents, hardening and drying the composition, and forming particles of the composition before, during or after hardening and drying.

22 Claims, No Drawings

GRANULATED MATERIAL AND PROCESS FOR THE PRODUCTION OF GRANULATED MATERIALS

The invention relates to a granulated material and to a process for the production of granulated materials.

These granulated materials are suitable as materials for absorbing liquids, for example water and aqueous liquids, oil and oily liquids, and for absorbing smells. They can be used, for example, as materials for scattering on operating room floors, for example in garages, workshops and factories, to absorb spilled liquids, and also as a filling material for cat trays to absorb the liquid portion of excrement. They are also suitable as carriers for pesticides, for example, insecticides, herbicides, fungicides etc., for use in houses and operating rooms, in farming and gardening inter alia.

Hitherto granulated materials consisting of types of natural clay have been used for such purposes, for example, fuller's earth, which has a low weight by volume. These granulated materials are obtained by allowing the clay to dry in the air, breaking it up, then drying it further or calcining it, and sieving it. Both the dried and the calcined product are suitable to a greater or lesser extent for absorbing liquids. By drying or calcining, free and/or bound water is driven out and a porous material is obtained, which in the form of a granulated material of a particle size of 0.3 to 7 mm has a weight by volume of approximately 550 g/dm$^3$ and a water absorption of approximately 80% by weight. As a result of the fact that clay is a natural material, the properties vary from batch to batch and depending on where the clay has been obtained, and it is consequently difficult to produce a constant and uniform product.

A granulated material has been found that does not have the disadvantages of the known granulated material. The granulated material according to the invention is characterised in that it is composed of cement, an inorganic, water-absorbing swelling agent, sand or ground stone and water. The process according to the application for producing a granulated material of this type is characterised in that cement, an inorganic water-absorbing swelling agent, sand or ground stone, water and if desired dyestuffs and/or perfumes and/or other additives are mixed to form a paste, the paste is allowed to harden and the hardened material dried, and before or after hardening and/or drying made into a granulated material.

There is to be understood in this description by water-absorbing swelling agent, a substance that can absorb water and as it does so swells. Generally these swelling agents can absorb 10 to 40 times their weight of water.

The cement, which hardens with the water, acts as a skeleton-forming substance and provides the granulated material with such a hardness that it is not easily crushed and/or pulverised when exposed to mechanical pressure during storage and/or transport.

The sand or ground stone acts as an inert blending agent to lower the cost price of the granulated material.

In order to harden, the cement requires only a few percent by weight of water based on its own weight. In the absence of other substances it can be mixed with a maximum of 35% by weight of water to form a paste. If more than 35% by weight of water is added to the cement the excess measure of water is not retained by the composition. If only cement to which water has been added is processed into a granulated material having a particle size of 0.3 to 7 mm, the granulated material in the absolutely dry state has a weight by volume of approximately 800–900 g/dm$^3$ and a water absorption of approximately 5–40% by weight. The minimum value for the weight by volume and the maximum value for the water absorption are achieved with Portland cement class C. These values are not, however, adequate for the intended purpose of the invention. In order to have an adequate absorbing power, a granulated material having a particle size of 0.3 to 7 mm must, in the completely dry state, have a maximum weight by volume of 700 g/dm$^3$ and a water absorption of at least 45% by weight.

These values, which are advantageous for the intended purpose, are obtained in accordance with the invention by the granulated material containing, in addition to the cement as the skeleton-forming substance, a water-absorbing swelling agent. The capacity of the granulated material to absorb liquids and the weight by volume of the granulated material are connected with the volume of the pores which have a capillary action. The greater the pore volume of the hardened granulated material, the greater the amount of liquid that can be absorbed and the lower is the weight by volume.

All types of clays, for example, come into consideration as inorganic swelling agents, such as, sepiolite, montmorillonite, kaolins, and burnable types of clay. It is also possible to use diatomaceous earth. The best results are obtained with bentonite in the sodium form. This is found naturally to a limited extent but can also be produced by a complicated activation process, which is known per se, from bentonite in the calcium form which is more readily available naturally. Where bentonite is referred to in this description, bentonite in the sodium form is meant.

The cement used may be any one of those commercially customary. The quick-setting types are preferred because of their short setting time. These also impart to the granulated material produced from them together with water the lowest weights by volume and the greatest water absorptions.

The blending agent used to lower the cost of the granulated material is sand of all kinds of origin, for example, dune sand, river sand and silver sand, or ground stone of natural or artificial origin. The use of beach sand is preferred because it contains fewer impurities than other types and because the distribution of the particle size is relatively constant from area to area and batch to batch.

To prepare the paste, the ratio of the weight of cement to the weight of blending agent is from approximately 55:45 to approximately 65:35, preferably 60:40. The water content in the paste, which determines the pore volume and therefore also the liquid absorption and the pore volume after hardening and drying, also varies within relatively narrow limits, that is from 60 to 120% by weight, calculated on the total dry substance.

The content of water-absorbing swelling agent depends on the nature of the swelling agent. Generally a mixture of swelling agent and water is added to a mixture of cement and blending agent. A mixture of water-absorbing swelling agent and water that at 20° C. has a viscosity of 15 to 25 cP is the most suitable. This is met, for example, by a mixture of sodium bentonite and water that contains 3–8% by weight of sodium bentonite.

By adding the water together with the water-absorbing swelling agent the quantity of water required for the paste can be metered in accurately and absorbed into the paste.

The quantity of water worked into the paste must be such that after the mixture has hardened and dried the end product has the desired liquid-absorbing capacity, the desired weight by volume and the desired hardness. The greater the amount of cement used, the harder is the hardened product. The greater the amount of water absorbed into the mixture, the greater are the pore volume and the absorption capacity of the end product and the lower is the hardness.

The quantity of blending agent, the quantity of water-absorbing swelling agent and the plasticity of the mixture of cement, sand, swelling agent and water in the unhardened state must be such that the mixture can be spread out to form a cohesive layer and/or pressed to form particles.

Although the cement and the swelling agent as well as sand and ground stone are the essential constituents of the granulated materials, these materials may also contain other constituents. For example, the granulated materials may be made a particular colour by incorporating in the mixture to be granulated a dyestuff, for example an inorganic or organic pigment. For example, by adding 0.3-5% by weight $Fe_2O_3$, calculated on the dry substance in the paste, to a paste of cement, bentonite, sand and water, a light cream or red-coloured granulated material can be obtained. By adding $Fe_2O_3$ the weight by volume of the granulated material is increased slightly and the water absorption reduced slightly. It is also possible to incorporate perfumes in the granulated materials. This is advantageously carried out after drying the mixture, however, so as to prevent evaporation of the perfumes during the drying operation. The dried material, preferably the finished granulated material, is impregnated with the perfume, which is advantageously dissolved or dispersed in a liquid.

The procedure for producing the granulated material is as follows: The quantities of water, swelling agent, cement blending agent and optionally additives necessary for a particular batch are introduced one after the other into a mixing device. Whilst these constituents are being added the mass is continuously mixed. Once all the constituents have been combined and mixed well, the mixture is left to stand for a period, for example 1 to 3 hours, at room temperature, in order to allow the water-absorbing swelling agent and the cement to absorb water. This is particularly important in the embodiment described further below in which the mixture is made into particles before hardening. During this time the mixture stiffens, which is desirable when a granulated material is to be produced. The paste becomes drier as a result of standing, and consequently during further processing does not adhere or scarcely adheres to the processing device.

The mixture thus obtained can now be further processed in a number of ways.

First of all, the mixture may be smeared or rolled into rough sheets, strips or slabs. These are allowed to harden so that they can then be broken up to form a granulated material, dried and sieved. Another possibility is first to dry the mixture after hardening and then break it up to form a granulated material and sieve it, or alternatively first to break up the mixture into a granulated material after hardening, then sieve it and dry it.

The hardening takes place by the cement absorbing water, as a result of which it fulfils its skeleton-forming function. This hardening can be accelerated by conveying steam through or over the material from the time that the skeleton formed by the cement is no longer washed out or leached out by the condensation water formed by the steam. Steam can be used approximately 4 to 10 hours after the mixture has been produced. By heating a mixture of cement, bentonite, sand and water to approximately 80° C. with steam, the hardening time is shortened by approximately 30%.

The hardening process can alternatively be accelerated by the addition of calcium chloride to the mixture. The hardening time is shortened by approximately 30% by 2.5% by weight of calcium chloride, calculated on the cement.

After the material has hardened it is dried, optionally having been broken up.

Drying can be effected in the air or in a cold air current, but is quicker if carried out in heated air.

For this it is possible to heat the material in still air but the material is preferably dried in a heated air current. The temperature of the air should be at least 220° C. The hardened material can be heated to approximately 350° C.

To the extent that fine fragments or dust is formed during the drying operation, this is returned to the mixing stage.

The material is then broken up, for example in a jaw crusher and/or a roll-type crusher, and the fractions of the desired particle size are isolated by sorting on sieves. Fractions that are too large are returned to the crusher whilst fractions that are too small are returned to the mixing device.

Instead of spreading the partially stiffened mixture into slabs, rough sheets or strips the mixture, either in the desired particle size and shape or not, can be shaped by pressing, rolling, extruding or agglomerating by means of rollers inter alia to form pellets, small rods, small blocks etc. The thus shaped particles can then be hardened in the manner described hereinbefore. After the cement skeleton has become sufficiently firm, steam can be conveyed over the particles. After hardening, the particles are dried and if necessary broken up and sieved. Instead of after drying, it is also possible for the particles to be broken up, dried and sieved after hardening. In this arrangement too, material that is too coarse is returned to the crusher and material that is too fine to the mixing device. In the case where the material is dried in the form of particles, this can be effected in a fluidised bed.

For processing the partially stiffened mixture of cement, water-absorbing swelling agent, blending agent and water the use of bentonite as swelling agent furthermore has the advantage that the so-called "green strength" of the mixture, that is the strength in the moist, unhardened state, is improved, as a result of which the mixture, owing to the better cohesion, can be handled more easily.

The granulated material according to the invention has, at a particle size of 0.3 to 7 mm, a weight by volume of approximately 400 to 800 $g/dm^3$ and a water absorption of approximately 40 to 115% by weight, calculated on completely dry granulated material. The capacity for absorbing liquids is determined by saturating with the liquid to be absorbed a weighed quantity of granulated material, of which the moisture content is known, and then weighing the granulated material again. The absorbing capacity is the percentage by weight of the absorbed liquid, calculated on the granulated material.

The granulated material obtained is excellently suitable for the purposes described at the beginning of this description as well as for thermal isolation and acoustic isolation.

For use as a carrier for pesticides, the granulated material can be impregnated with a pesticide in liquid, dissolved or dispersed form.

In the following Examples, a granulated material has been produced from cement and water without a water-absorbing swelling agent.

COMPARISON EXAMPLE A 3 kg of blast furnace slag cement class A were made up into a paste with 660 ml of water. This paste was smeared to form slabs 1 cm thick which were allowed to harden at room temperature. After hardening, the slabs were broken up into a granulated material using a roll-type crusher, the fraction containing particles of a size of 0.3–7.0 mm being sieved out and dried in a drying chamber at 210° C.

This test was repeated using blast furnace slag cement class B instead of class A. The results of the tests were as follows:

|  | Class A | Class B |
| --- | --- | --- |
| Hardening time, hours | 70 | 70 |
| Weight by volume, g/dm$^3$ | 894 | 875 |
| Water absorption, % by weight | 12 | 14 |

COMPARISON EXAMPLE B

Comparison Example A was repeated, except that instead of 660 ml of water, 1055 ml were used.

The results were as follows:

|  | Class A | Class B |
| --- | --- | --- |
| Hardening time, hours | 100 | 100 |
| Weight by volume, g/dm$^3$ | 846 | 839 |
| Water absorption, % by weight | 21 | 26 |

COMPARISON EXAMPLE C

Comparison Example A was repeated, except that instead of blast furnace slag cement, Portland cement class A, B and C was used, The results were as follows:

|  | Class A | Class B | Class C |
| --- | --- | --- | --- |
| Hardening time, hours | 70 | 48 | 24 |
| Weight by volume, g/dm$^3$ | 877 | 862 | 853 |
| Water absorption, % by wt. | 13 | 16 | 18 |

COMPARISON EXAMPLE D

Comparison Example B was repeated, except that Portland cement class A, B and C was used instead of blast furnace slag cement.

The results were as follows:

|  | Class A | Class B | Class C |
| --- | --- | --- | --- |
| Hardening time, hours | 70 | 48 | 24 |
| Weight by volume, g/dm$^3$ | 841 | 829 | 806 |

-continued

|  | Class A | Class B | Class C |
| --- | --- | --- | --- |
| Water absorption, % by wt. | 26 | 33 | 39 |

The following Examples were carried out in order to show the influence of a swelling agent (bentonite) on the properties of the granulated material. In the Examples "gel" is used to mean a mixture of 15 parts by weight of bentonite and 85 parts by weight of water.

COMPARISON EXAMPLE E 3 kg of blast furnace slag cement class A were mixed thoroughly with 1.4 kg of gel. The procedure was then as in Comparison Example A.

This test was repeated with blast furnace slag cement class B instead of class A.

The results were as follows

|  | Class A | Class B |
| --- | --- | --- |
| Hardening time, hours | 76 | 72 |
| Weight by volume, g/dm$^3$ | 798 | 771 |
| Water absorption, % by weight | 34 | 41 |

COMPARISON EXAMPLE F

Comparison Example E was repeated, but 2 kg instead of 1.4 kg of gel were used with 3 kg of blast furnace slag cement.

The results were as follows:

|  | Class A | Class B |
| --- | --- | --- |
| Hardening time, hours | 84 | 80 |
| Weight by volume, g/dm$^3$ | 631 | 614 |
| Water absorption, % by weight | 58 | 59 |

COMPARISON EXAMPLE G

Comparison Example F was repeated, but with 2 kg of gel, 2 kg instead of 3 kg of blast furnace slag cement were used.

The results were as follows:

|  | Class A | Class B |
| --- | --- | --- |
| Hardening time, hours | 100 | 100 |
| Weight by volume, g/dm$^3$ | 608 | 611 |
| Water absorption, % by weight | 67 | 62 |

COMPARISON EXAMPLE H

Comparison Example F was repeated, but 3 kg of Portland cement class A, B and C were used instead of blast furnace slag cement with the 2 kg of gel.

The results were as follows:

|  | Class A | Class B | Class C |
| --- | --- | --- | --- |
| Hardening time, hours | 90 | 53 | 27 |
| Weight by volume, g/dm$^3$ | 626 | 602 | 584 |
| Water absorption, % by weight | 55 | 61 | 68 |

COMPARISON EXAMPLE J

Comparison Example G was repeated, but instead of 2 kg of blast furnace slag cement, 2 kg of Portland cement class A, B and C were used with the 2 kg of gel. The results were as follows:

|  | Class A | Class B | Class C |
|---|---|---|---|
| Hardening time, hours | 96 | 54 | 27 |
| Weight by volume, g/dm$^3$ | 612 | 581 | 536 |
| Water absorption, % by weight | 62 | 69 | 76 |

COMPARISON EXAMPLE K

Comparison Example J was repeated with Portland cement class B and C, but 2.4 kg instead of 2 kg of gel were used with the 2 kg of Portland cement. As a result of the insufficient degree of hardness of the granulated material obtained with Portland cement class A, this quality of cement was not further used.
The results were as follows:

|  | Class B | Class C |
|---|---|---|
| Hardening time, hours | 54 | 27 |
| Weight by volume, g/dm$^3$ | 570 | 522 |
| Water adsorption, % by weight | 73 | 88 |

COMPARISON EXAMPLE L

Comparison Example K was repeated, but 2.8 kg instead of 2.4 kg of gel were used with the 2 kg of Portland cement.
The results were as follows:

|  | Class B | Class C |
|---|---|---|
| Hardening time, hours | 60 | 28 |
| Weight by volume, g/dm$^3$ | 549 | 506 |
| Water absorption, % by weight | 79 | 102 |

A number of examples illustrating the process according to the invention now follows. "Sand" means silver sand here.

EXAMPLE I 1 kg of blast furnace slag cement class B and 1 kg of sand were mixed thoroughly with 1 kg of gel. The procedure was then as in Comparison Example A. On account of the long hardening time blast furnace slag cement class A was not examined.
The results were as follows:

| Hardening time, hours | 92 |
|---|---|
| Weight by volume, g/dm$^3$ | 627 |
| Water absorption, % by wt. | 55 |

EXAMPLE II

Example I was repeated, but 1.1 kg of blast furnace slag cement class B, 0.9 kg of sand and 2 kg of gel were used.
The results were as follows:

| Hardening time, hours | 92 |
|---|---|
| Weight by volume, g/dm$^3$ | 626 |
| Water absorption, % by wt. | 57 |

EXAMPLE III

Example II was repeated, except that 2.5 kg instead of 2 kg of gel were used with 1.1 kg of blast furnace slag cement class B and 0.9 kg of sand.
The results were as follows:

| Hardening time, hours | 100 |
|---|---|
| Weight by volume, g/dm$^3$ | 609 |
| Water absorption, % by wt. | 62 |

EXAMPLE IV

Example II was repeated, except that 1.1 kg of Portland cement class B and C instead of blast furnace slag cement was used with 0.9 kg of sand and 2 kg of gel.
The results were as follows:

|  | Class B | Class C |
|---|---|---|
| Hardening time, hours | 60 | 26 |
| Weight by volume, g/dm$^3$ | 610 | 543 |
| Water absorption, % by wt. | 63 | 75 |

EXAMPLE V

Example III was repeated, except that 0.9 kg of Portland cement class B and C instead of 1.1 kg of blast furnace slag cement class B and 1.1 kg instead of 0.9 kg of sand were used, with 2.5 kg of gel.
The results were approximately the same as those in Example IV except that the granulated material with class B is brittle whereas the granulated material with class C is of adequate hardness.

EXAMPLE VI

Example IV was repeated, except that 3 kg instead of 2 kg of gel were used with 1.1 kg of Portland cement and 0.9 kg of sand.
The results were as follows:

|  | Class B | Class C |
|---|---|---|
| Hardening time, hours | 66 | 27 |
| Weight by volume, g/dm$^3$ | 581 | 514 |
| Water absorption, % by wt. | 71 | 97 |

EXAMPLE VII

Example V was repeated, except that 3 kg instead of 2.5 kg of gel were used with 0.9 kg of Portland cement and 1.1 kg of sand.
The results were approximately the same as those in Example IV, but the granulated materials were rather brittle.

In the following there are a number of examples of the use of the granulated materials produced according to the invention.

USE EXAMPLE 1

On a variety of concrete floors (flagstones, Stelkon tiles, cast concrete) surface areas of 1 m$^2$ were smeared with 300 ml of motor oil, type 10/W30. 400 g of the granulated material obtained according to Example IV with Portland cement class B were scattered onto the areas covered with oil. After 4 hours the granulated material was removed. This showed that the oil had been almost completely absorbed by the granulated material. To remove the remaining oil a further 50 g of the same granulated material was scattered onto the parts soiled by oil. After people and machines had run to and fro over these parts of the floor for a few hours the granulated material was removed. This showed that the oil was now completely absorbed.

When the same test was carried out with household oil the oil had been completely absorbed after 45 minutes.

The same test carried out with Carter oil showed that this oil had been completely absorbed after approximately 24 hours.

USE EXAMPLE 2

A cat tray, the bottom of which was covered with a 7 cm thick layer of peat dust, sand, paper shavings or sawdust, began to smell unpleasant after only one day's use by a cat.

When instead of this filling layers of the same thickness consisting of a granulated material according to one of the Examples I to VII were used, this filling could be used for 6 to 7 days before an unpleasant smell was noticeable.

What we claim is:

1. A granulated absorbent material made from a mixture of dry constituents which comprises cement, an inorganic water-absorbing swelling agent, and an aggregate comprising sand, ground stone or a mixture of sand and ground stone, together with water, the weight ratio of the cement to the total of the sand and ground stone being in the range of from approximately 55:45 to approximately 65:35, the ratio of water-absorbing swelling agent to water being such that a mixture of those constituents has a viscosity in the range of from 15 to 25 centipoises at 20° C., and the quantity of water being in the range of from 60 to 120% by weight of the quantity of said dry constituents.

2. A process for the production of a granulated material, wherein cement, an inorganic water-absorbing swelling agent, an aggregate comprising sand, ground stone or a mixture of sand and ground stone, and water are formed into a paste, the paste is caused to harden and the hardened composition is dried, and the paste is formed into particles before, during or after hardening and drying, the weight ratio of cement to the sand and ground stone in said paste being in the range of approximately 55:45 to approximately 65:35, the ratio of water-absorbing swelling agent to water being such that a mixture of those constituents has a viscosity in the range of from 15 to 25 centipoises at 20° C., and the quantity of water being from 60 to 120% by weight of the total quantity of the cement, swelling agent and aggregate.

3. A process according to claim 2 wherein said weight ratio of cement to said aggregate is approximately 3:2.

4. A process according to claim 2, wherein the inorganic, water-absorbing swelling agent comprises a clay.

5. A process according to claim 4, wherein the clay comprises sodium bentonite, said bentonite comprising from 3–8% by weight of the total weight of said water and said bentonite.

6. The process according to claim 2, wherein said aggregate comprises beach sand.

7. A process according to claim 2, wherein the paste mixture is allowed to stand at room temperature for a period of from 1 to at least 3 hours after mixing before it is processed further.

8. A process according to either of claims 2 or 7, wherein the paste mixture is formed into a layer, the layer is caused to harden, the hardened layer is broken up and the broken material is either first dried and then sieved to the desired particle size, or first sieved to the desired particle size and then dried.

9. A process according to claim 8, wherein fine particles formed when the material is broken up are re-circulated to the mixing stage.

10. A process according to claim 7, wherein the paste mixture is formed into a granulated material of the desired particle shape and size, the granulated material is caused to harden and the hardened granulated material is dried.

11. A process according to claim 7, wherein, whilst the constituents are being mixed, calcium chloride is added as an agent for accelerating the hardening.

12. A process according to claim 7, wherein, during hardening, steam is conveyed over or through the layer of the granulated material.

13. A process according to claim 7, wherein the hardened material is dried in a current of cold air.

14. A process according to claim 7, wherein the hardened material is dried in still or flowing hot air.

15. A process according to claim 14, wherein the drying is carried out with air at a temperature of at least 220° C.

16. A process according to any one of claims 2 or 7, wherein a granulated material having a particle size of 0.3 to 7 mm is produced.

17. A granulated material, whenever prepared by a process as claimed in any one of claims 2 or 7.

18. The material claimed in claim 1 in which said water-absorbing swelling agent comprises a clay.

19. The material claimed in claim 18 in which said clay comprises sodium bentonite, said bentonite comprising from 3–8% by weight of the total weight of said water and said bentonite.

20. The material claimed in any one of claims 1, 18 or 19 in which said granulated material comprises particles having a size in the range of 0.3 to 7.0 mm.

21. The granulated material claimed in claim 20 having a density in the range of 400 to 800 g/dm³ and a water absorbency in the range of 40 to 115% by weight of the granulated material.

22. A process as in any one of claims 2, 3, 4 or 5 wherein a mixture of cement and said aggregate is formed and a mixture of the water absorbing swelling agent and water is incorporated with the mixture so obtained.

* * * * *